United States Patent
Mehner et al.

(10) Patent No.: US 9,531,705 B1
(45) Date of Patent: Dec. 27, 2016

(54) SYSTEMS AND METHODS FOR COMPUTER DIGITAL CERTIFICATE MANAGEMENT AND ANALYSIS

(71) Applicant: United Services Automobile Association (USAA), San Antonio, TX (US)

(72) Inventors: Carl Mehner, San Antonio, TX (US); Dale Lawrence, Boerne, TX (US)

(73) Assignee: UNITED SERVICES AUTOMOBILE ASSOCIATION, San Antonio, TX (US)

(*) Notice: Subject to any disclaimer, the term of this patent is extended or adjusted under 35 U.S.C. 154(b) by 0 days.

(21) Appl. No.: 14/206,478

(22) Filed: Mar. 12, 2014

Related U.S. Application Data (60) Provisional application No. 61/784,388, filed on Mar. 14, 2013.

(51) Int. Cl.
*H04L 29/06* (2006.01)

(52) U.S. Cl.
CPC ................ *H04L 63/0823* (2013.01)

(58) Field of Classification Search
CPC .................................. H04L 63/0823
USPC .......................................... 713/157
See application file for complete search history.

(56) References Cited

U.S. PATENT DOCUMENTS

| | | | | |
|---|---|---|---|---|
| 2008/0091952 A1* | 4/2008 | Sumner | ................ | H04L 63/064 713/185 |
| 2009/0019280 A1* | 1/2009 | Blaikie | ................ | H04L 9/3268 713/158 |

OTHER PUBLICATIONS

Internet Engineering Task Force RFC 5280 May 2008 Network Working Group, pp. 1-151.*
Lloyd et al, AKID/SKID Implementation Guideline Sep. 2002, pp. 1-3.*
Internet Engineering Task Force RFC 5246 Transport Layer Security, version 1.2 Aug. 2008. pp. 1-104.*

* cited by examiner

*Primary Examiner* — Jung Kim
*Assistant Examiner* — Thomas Ho
(74) *Attorney, Agent, or Firm* — Baker & Hostetler LLP (57) ABSTRACT

Described herein are methods and systems for updating digital certificates on a computer and testing to confirm that the update was performed correctly. The testing may involve confirming that a server's common name (CN) and/or a server's subject alternative name (SAN) matches the domain name server (DNS) name utilized to access the server, confirming that, for all the certificates sent in chain, each certificate's expiration date is less than or equal to the expiration date of that certificate's parent certificate, confirming that the certificates' authority key identifier (AKI), subject key identifier (SKI), and/or authority information access (AIA) are in compliance, and comparing available cipher suites to a list of pre-approved cipher suites.

16 Claims, 6 Drawing Sheets

SYSTEMS AND METHODS FOR COMPUTER DIGITAL CERTIFICATE MANAGEMENT AND ANALYSIS

RELATED APPLICATION

The present application claims the benefit of U.S. Provisional Patent Application No. 61/784,388, titled "CERTIFICATE INSTALLATION INSPECTION CHECKLIST" and filed Mar. 14, 2013, the entire contents of each of which is incorporated herein by reference.

FIELD OF THE INVENTION

The disclosed embodiments generally relate to computer security, and more particularly, to public key infrastructure digital certificate management, analysis and replacement.

BACKGROUND OF THE INVENTION

The use of public key encryption techniques, such as those based on and/or that practice the algorithm developed by Ron Rivest, Adi Shamir and Leonard Adleman in 1977 (commonly referred to as RSA), have generally enabled secure communications over the internet. Unfortunately, it is still common for errors in security settings and digital certificate replacement to undermine what would otherwise be unbreakable security, from a practical standpoint.

Accordingly, there remains an unmet need to provide systems and methods to ensure that computer certificates have been replaced and/or configured correctly.

SUMMARY OF THE INVENTION

Described herein is a method and system for updating public key infrastructure (PKI) digital certificates on a computer and utilizing testing procedures to confirm that the same was performed correctly. In one embodiment, after a certificate is replaced, a test is performed to confirm that a server's common name (CN) and/or a server's subject alternative name (SAN) matches the domain name server (DNS) name utilized to access the server. In another embodiment, a test is performed to confirm that, for all the certificates sent in chain, that each certificate's expiration date is less than or equal to the expiration date of that certificate's parent certificate. In another embodiment, the certificates' authority key identifier (AKI), subject key identifier (SKI), and/or authority information access (AIA) are tested to confirm compliance. In yet another embodiment, available cipher suites are compared against a list of pre-approved cipher suites. In another embodiment, settings related to client-side renegotiation and secure renegotiation are tested to confirm compliance. Further, it is contemplated herein that the described embodiments may be combined and utilized in any combination as would be understood by someone skilled in the art.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described herein. One skilled in the art will appreciate further features and advantages of the illustrated embodiments based on the above-described embodiments. Accordingly, the illustrated embodiments are not to be limited by what has been particularly shown and described, except as indicated by the appended claims.

It is to be understood that network 50 is a geographically distributed collections of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a dwelling, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the four of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as first and second client computers 90) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 1:
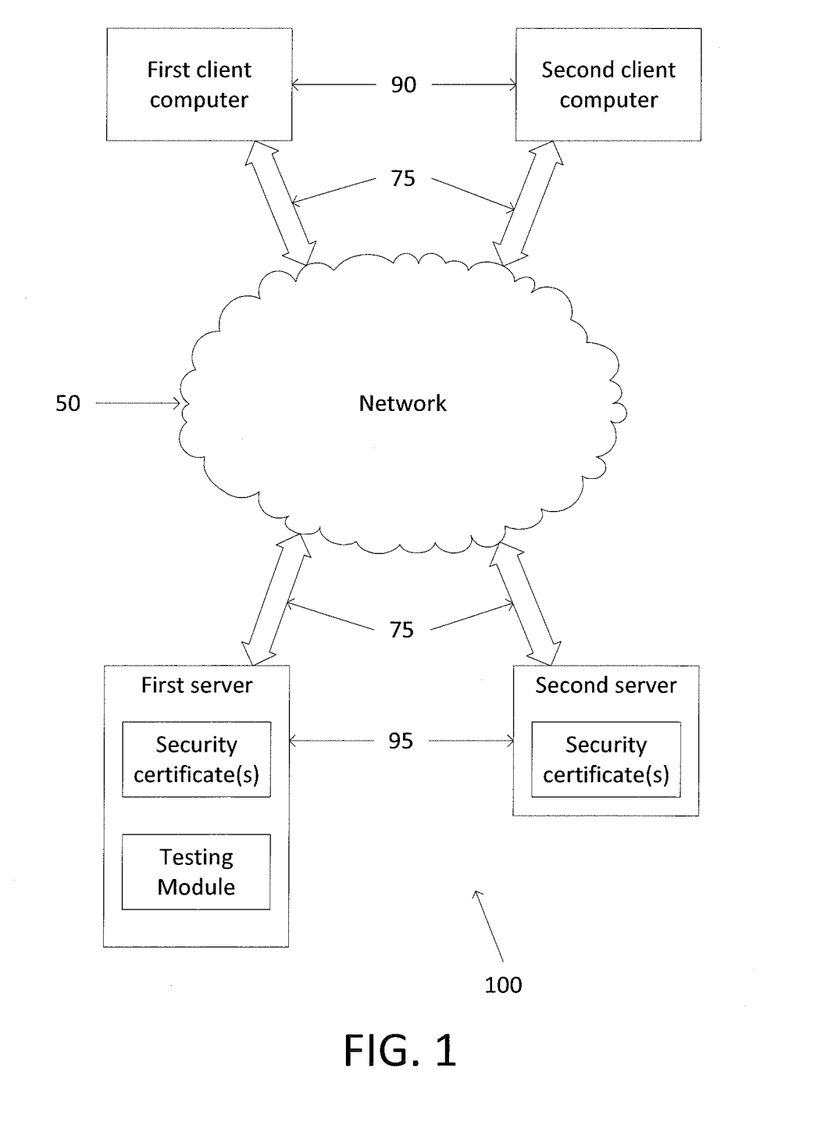
FIG. 1 illustrates an example system that may utilize embodiments described herein.

Turning now descriptively to the drawings, FIG. 1 depicts an exemplary system 100 that may utilize one or more of the embodiments described herein. For exemplary purposes only and without limitation, first client computer 90 may request secure communications with first server 95. First server 95 sends one or more certificates to first client computer 90. In one embodiment, first server 95 will (need to) send two certificates, but it may only (need to) send one certificate, although it is contemplated herein that servers 95 may send any number of certificates as would be recognized by those skilled in the art. Upon receiving certificates from first server 95, first client computer 90 may want to confirm that the certificates certify that first server 95 represents who it claims to (e.g., that a server claiming to service GMAIL® actually represents the service GMAIL®), and first client computer 90 may also want to confirm that the certificates received from first server 95 are valid (e.g., by confirming that there are no inconsistencies and/or errors that may be indicative of a problem).

In one or more embodiments, after a digital certificate is updated and/or configured on first server 95, one or more methods described herein may be (immediately) performed on servers 95 and/or client computers 90 to confirm that the certificate replacement and/or configuration was correctly performed.

Figure 5:
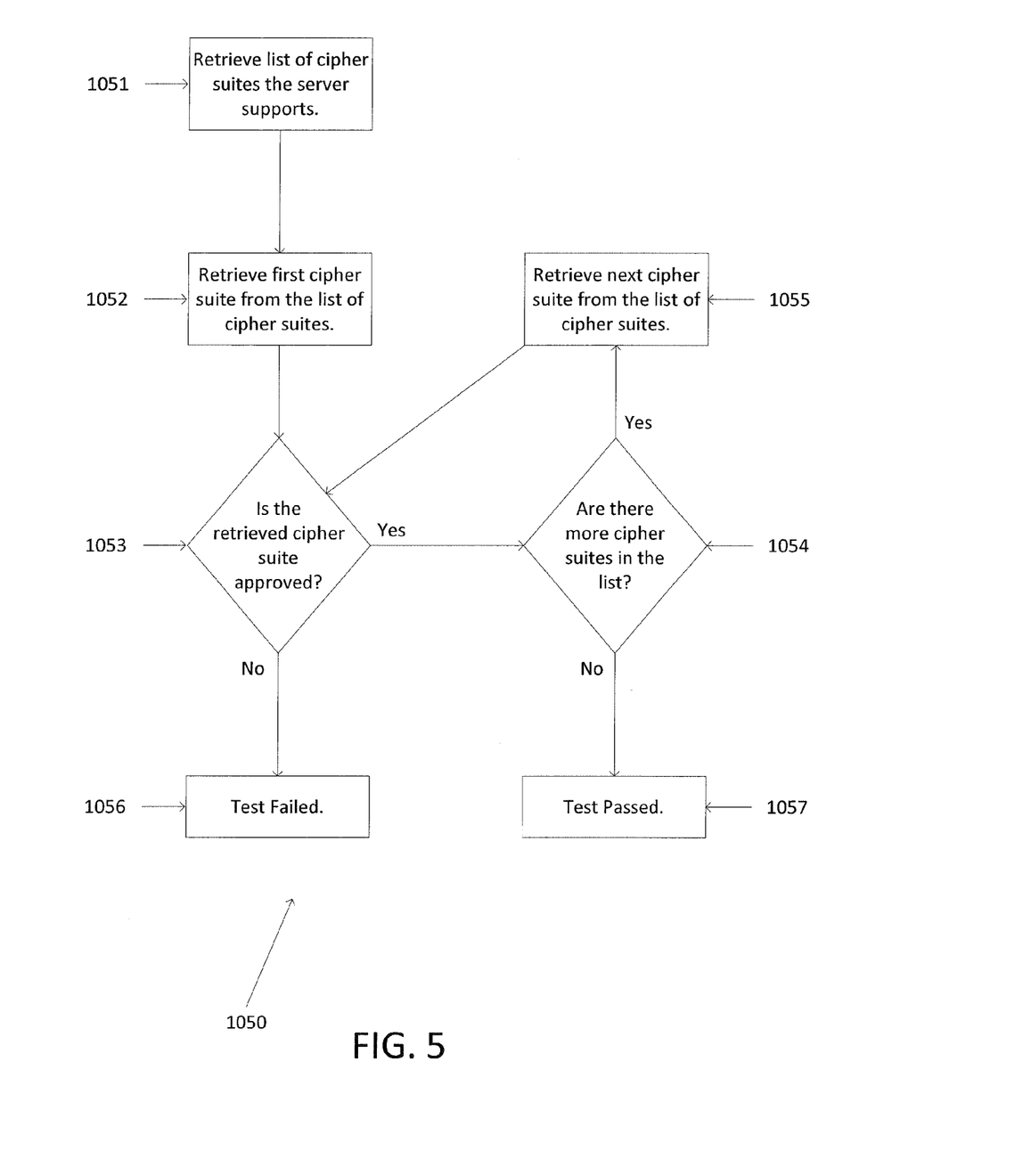
Figure 6:
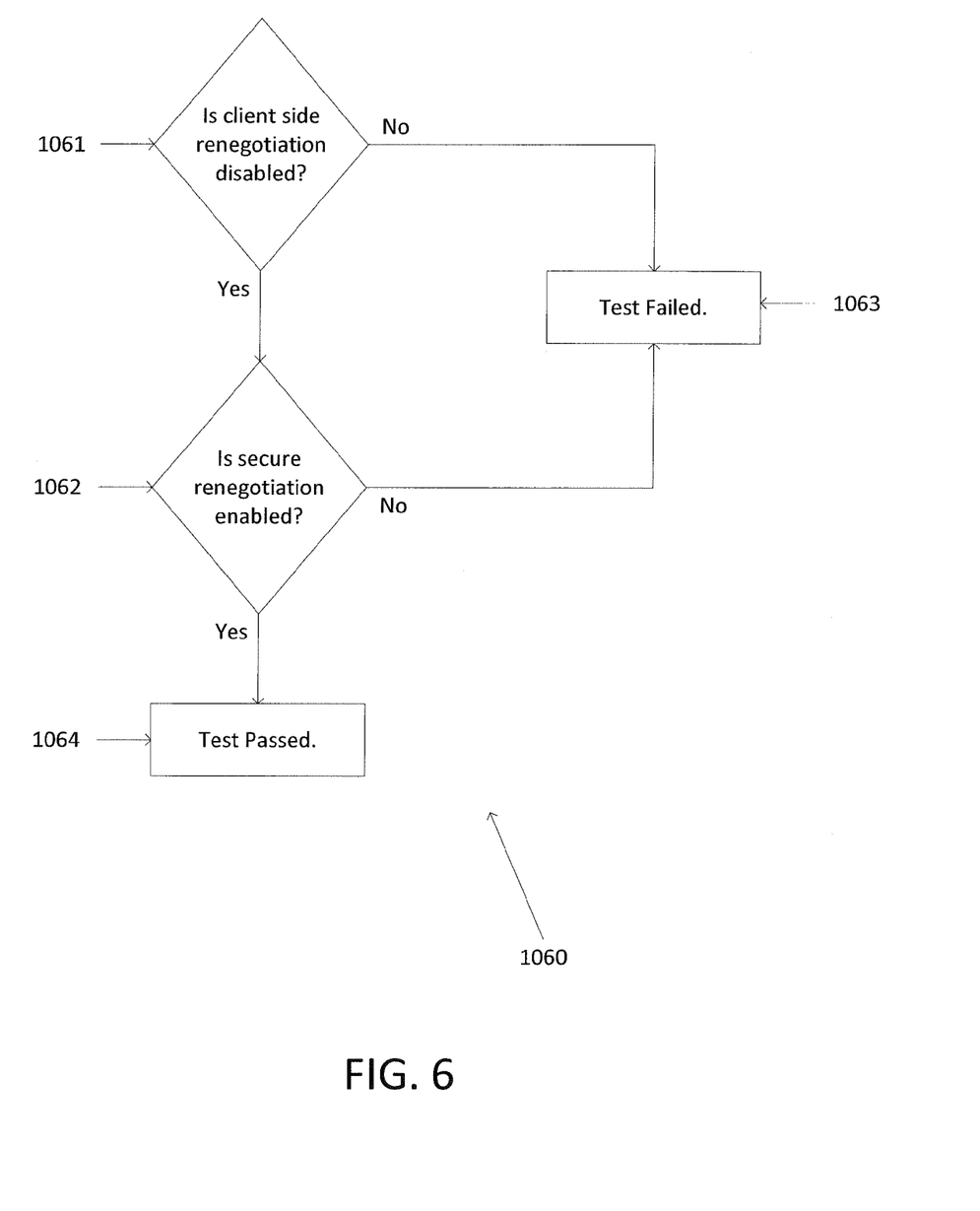

The methods described herein may be utilized to:

1) Confirm that the DNS matches the certificate name (one embodiment of this method being shown in FIG. 2), 2) Confirm that all certificates in the chain are sent (one embodiment of this method being shown in FIG. 3), 3) Confirm that the certificates in the chain are correct (one embodiment of this method being shown in FIG. 4), 4) Confirm that only approved cipher suites are enabled on the connection (one embodiment of this method being shown in FIG. 5), and 5) Confirm that renegotiation settings are correct (one embodiment of this method being shown in FIG. 6).

Figure 2:
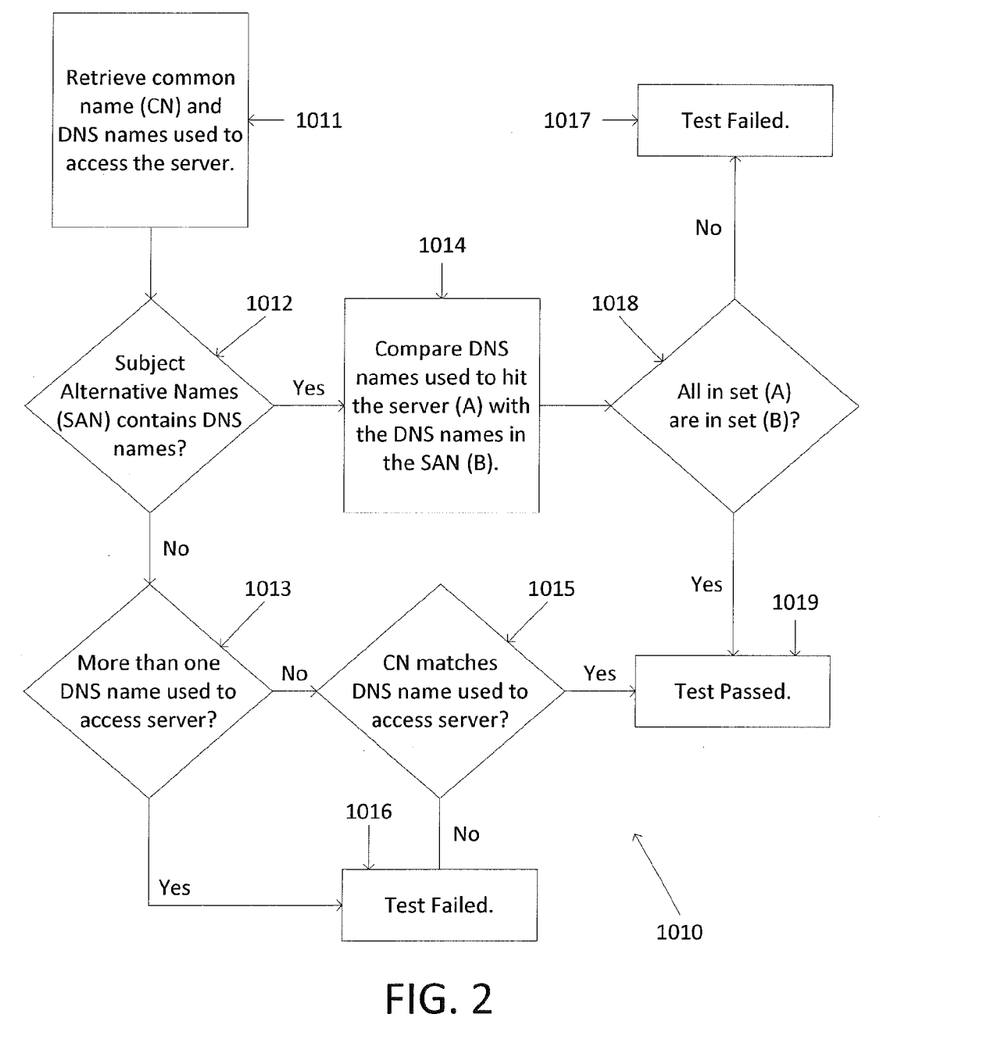
FIGS. 2-6 are flow diagrams of operation steps of digital certificate tests to be performed on a computing device.

Turning now to FIG. 2, illustrated therein is a method (process 1010) of assuring that the domain name system (DNS) matches the name(s) in the certificate received. Starting at step 1011, the Common Name (CN) and the DNS name(s) used to access the server are retrieved. Subsequently, it is identified whether the Subject Alternative Name (SAN) contains DNS names (step 1012). If it does, then it is determined whether each of the DNS names used to find the server (set A) are in the DNS names in the SAN (set B) (steps 1014 and 1018). If so, then the test passes (step 1019); otherwise the test fails (step 1017).

However, if the SAN does not contain the DNS names, then it is determined whether there is more than one DNS name used to access the server (step 1013). If there are, then the test fails (step 1016), otherwise it is determined whether the CN matches the DNS name used to access the server (step 1017). If the CN does not match the DNS name used to contact server 95, then the test fails (step 1016); otherwise, the test passes (step 1019).

Figure 3:
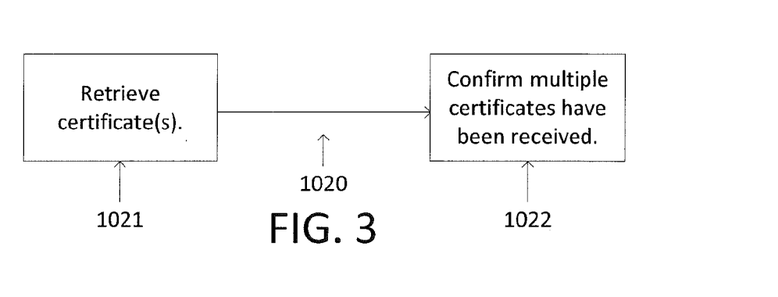

Turning now to FIG. 3, illustrated therein is a method (process 1020) of confirming that all certificates in a certificate chain have been sent. Starting at step 1021, all of the certificates are retrieved, and subsequently at step 1022 analysis is performed on the retrieved certificates to confirm that they have all been received. The results of this analysis may inform and/or dictate the determination of whether the server has an acceptable security configuration.

Figure 4:
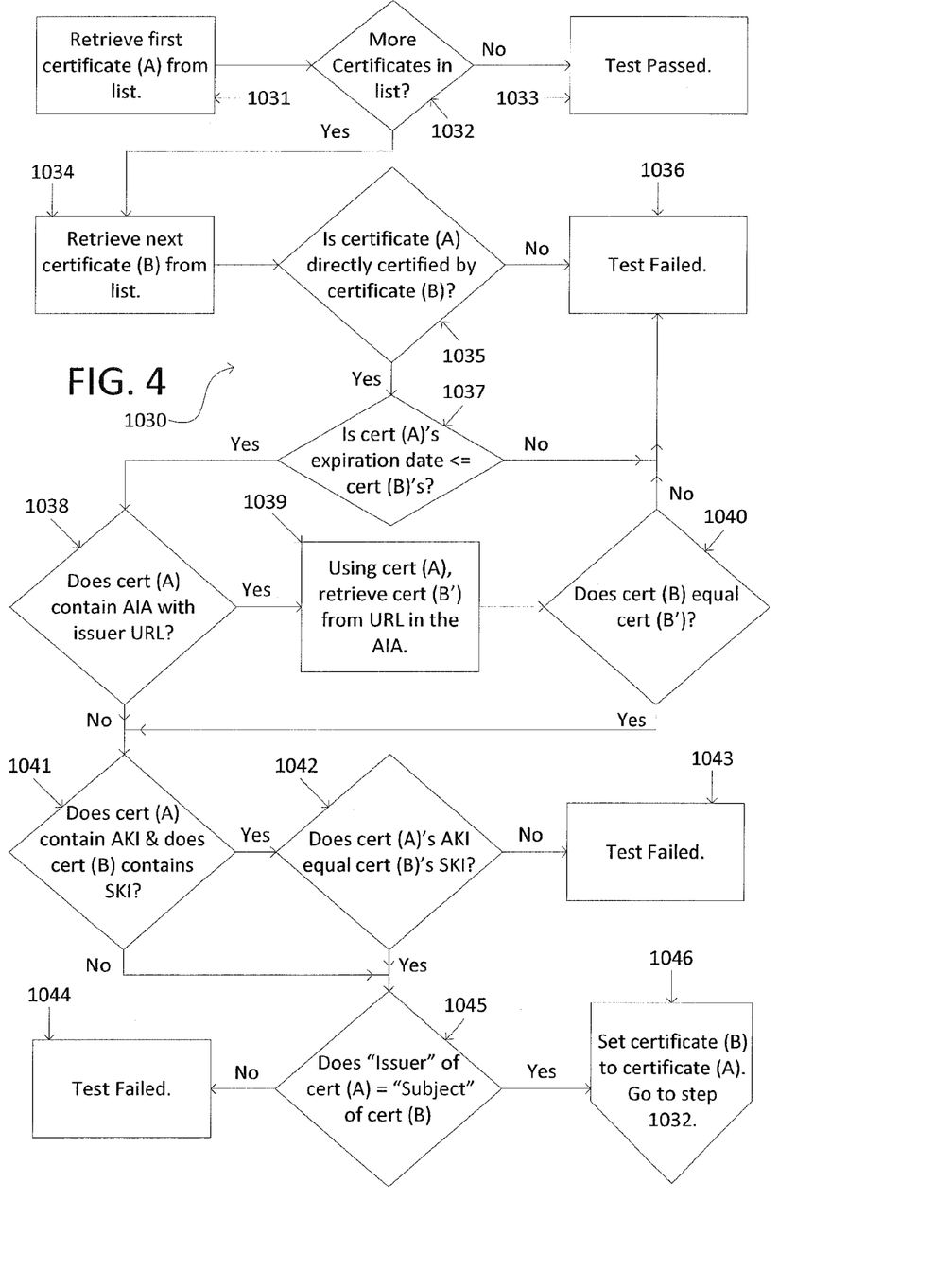

Turning now to FIG. 4, illustrated therein is a method (process 1030) of confirming that all certificates in a certificate chain are correct. Starting at step 1031, the first certificate (referred to as "certificate (A)" and/or "cert (A)") is retrieved from the certificate list. A check is performed if there are more certificates in the certificate chain. If there are the process proceeds to step 1034; otherwise the process proceeds to step 1033 and the certificate chain has passed this test.

If there are more certificates in the certificate list, the next certificate (referred to as "certificate (B)" and/or "cert (B)") is retrieved. If certificate (A) is not directly certified by certificate (B), then the test fails (step 1036); otherwise, the process proceeds to step 1037. Via step 1037, if certificate (A)'s expiration date is later than certificate (B)'s expiration date, then the test fails (step 1036); otherwise, the process proceeds to step 1038. Via step 1038, if certificate (A) contains Authority Information Access (AIA) with the issuer's URL, then the process proceeds to step 1039; otherwise, the process proceeds to step 1041. Via step 1039, utilizing certificate (A), a temporary certificate (referred to as "certificate (B')" and/or "cert (B')") is retrieved based on the URL in the AIA. Via step 1040, if certificate (B) does not equal certificate (B') then the process fails (step 1036); otherwise, the process proceeds to step 1041.

Subsequently, assuming the process has yet to fail, if certificate (A) contains an Authority Key Identifier (AKI) and certificate (B) contains a Subject Key Identifier (SKI), and cert (A)'s AKI does not equal cert (B)'s SKI, the process fails (at step 1043 via step 1042). However, if certificate (A) does not contain an Authority Key Identifier (AKI), or if certificate (B) does not contain a Subject Key Identifier (SKI), or if certificate (A)'s AKI equals certificate (B)'s SKI, then the process proceeds to step 1045 (each "or" in this sentence is an inclusive or, as will be recognized by those skilled in the art reading this paragraph while concurrently reviewing FIG. 4).

Via step 1045, if the "Issuer" value for certificate (A) does not equal the "Subject" value for certificate (B), then the process fails (step 1044). Otherwise, "certificate (B)" is placed into "certificate (A)" (step 1046) in preparation for proceeding to step 1032, and, if there are more certificates in the certificate chain, placing a new certificate in "certificate (B)" (via step 1034). Subsequently, if step 1046 leads to step 1034 (via step 1032), during the next iteration of step 1035 through 1046, what was formerly certificate (B) will be considered certificate (A) and a new certificate (B) will be retrieved from the certificate chain (such methodology will be readily understood by those skilled in the computer arts to whom this disclosure relates).

Turning now to FIG. 5, illustrated therein is a method (process 1050) of confirming that only acceptable cipher suites are enabled. In a common situation, a server has a collection of cipher suites (e.g., 41 of them) that it may be configured to use, and when a new communication is initiated with a client that itself has a collection of cipher suites (e.g., 4 of them), the server and the client will typically attempt to identify the strongest cipher suite that is common to both of them. Although it is important a server to be "as fluent as possible" with cipher suites (thus decreasing the chances that a client will contact the server and they cannot identify any common cipher suites), it is also important not to dilute the strength of the server's security by allowing sub-standard cipher suites (e.g., non-approved cipher suites) the possibility of being utilized for meaningful communications. Turning back to FIG. 5, FIG. 5 is at least partly directed at balancing and solving this issue.

Starting at step 1051, a list of cipher suites that the server supports are retrieved, and the first cipher suite from the list is selected (step 1052). If the selected cipher suite is not approved, then the test fails (step 1056); otherwise, it is determined whether there are more cipher suites in the list. If there are not, then the test passed (step 1057). Otherwise, the next cipher suite is retrieved (step 1055) and tested (step 1053).

Turning now to FIG. 6, illustrated therein is a method (process 1060) of confirming that a server's renegotiation settings are correctly configured. Starting at step 1061, it is determined whether the server prohibits client side renegotiation, and if it does, it is determined whether the server permits secure renegotiations (step 1062). If either condition fails, the test fails (step 1064). Otherwise, this test passes (step 1065).

In one or more embodiments, the methods and systems described herein may be utilized to test security configurations related to server-to-server communications (e.g., first server 95 and second server 95).

Figure 7:
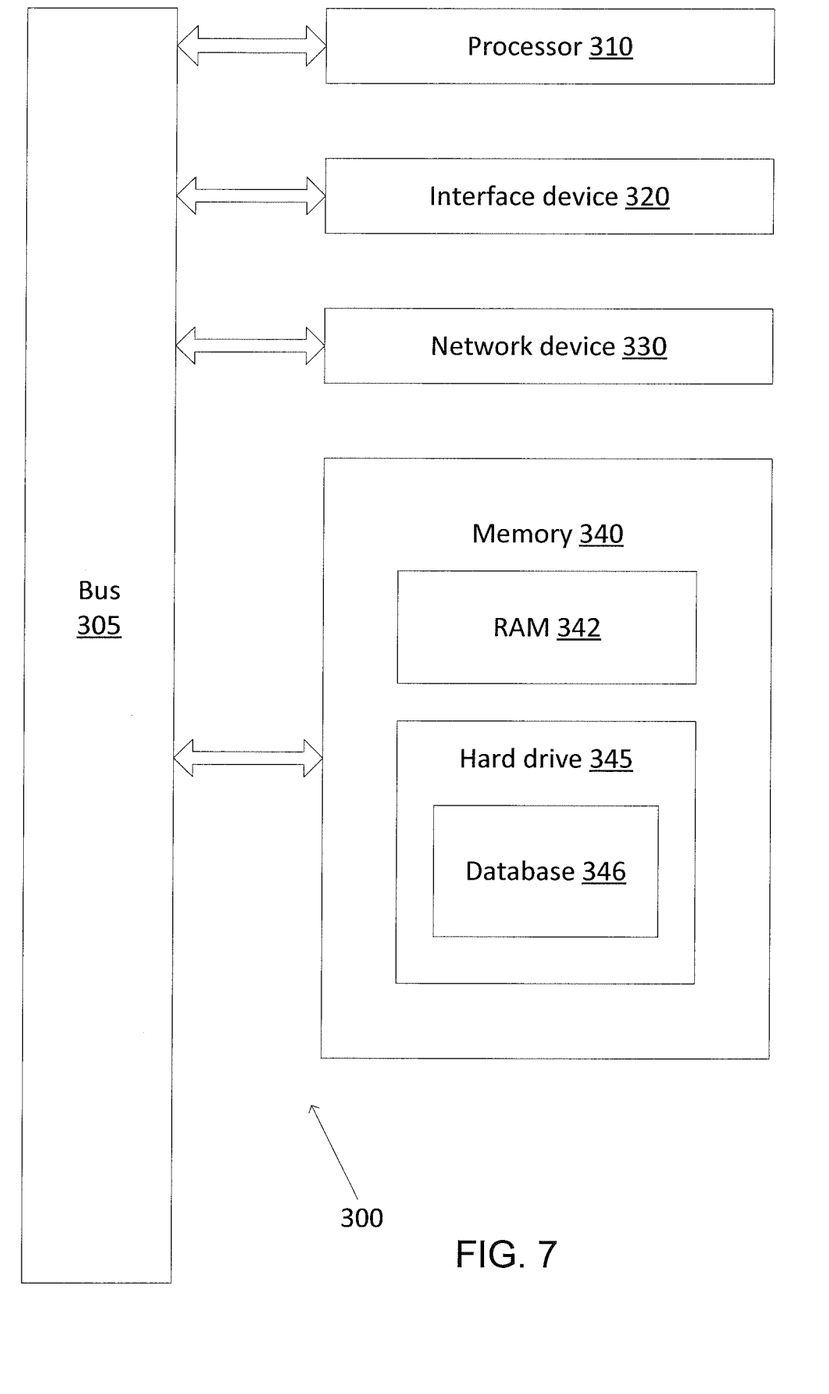
FIG. 7 illustrates a network computer device/node in accordance with an illustrated embodiment.

FIG. 7 is a schematic block diagram of an example computing device 300 that may be used (or components thereof) with one or more embodiments described herein. As explained above, in different embodiments these various devices be configured to communicate with each other in any suitable way, such as, for example, via communication 75 over networks 50.

Device 300 is only one example of a suitable system and is not intended to suggest any limitation as to the scope of use or functionality of embodiments of the invention described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 7 in the form of a general-purpose computing device. The components of device 200 may include, but are not limited to, one or more processors or processing units 310, a system memory 340, interface device 320, and a bus 305 that couples various system components including system memory 340 to processor 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include database 346. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

Testing module 105, has a set (at least one) of engines, which may be stored in memory 340, and may function solely or in combination with an operating system, one or more application programs, other program modules, and program data. Each of the operating system, one or more application programs, other program modules, and program data or some combination thereof, may include an implementation of a networking environment. Management module 105 generally carry out the functions and/or methodologies of embodiments of the invention as described herein.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIG. 1 is intended to provide a brief, general description of an illustrative and/or suitable exemplary environment in which embodiments of the below described present invention may be implemented. FIG. 1 is exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

It is recognized and contemplated herein that the steps and/or methods may be combined and/or performed in any combination and/or order as is practicable. Thus, for exemplary only and without limitation, With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for testing security settings for a computing device comprising:
   receiving at least one digital certificate from the computing device, the at least one digital certificate including a certificate chain that includes a first certificate preceding a second certificate, each certificate in the certificate chain having an expiration date;
   identifying whether the first certificate's expiration date is later than the second certificate's expiration date;
   determining that the at least one digital certificate is invalid when the first certificate's expiration date is later than the second certificate's expiration date;
   determining whether the first certificate contains an Authority Information Access (AIA) entry with a URL that can be utilized to retrieve a third certificate;
   when the first certificate contains such a URL:
      using the URL in the first certificate's AIA to retrieve the third certificate, and
      comparing the third certificate to the second certificate; and
   determining that the at least one digital certificate is invalid when the second certificate is not identical to the third certificate.

2. The computer-implemented method of claim 1, further comprising:
   determining whether the first certificate is directly certified by the second certificate; and
   determining that the at least one digital certificate is invalid when the first certificate is not directly certified by the second certificate.

3. The computer-implemented method of claim 1, further comprising:
   determining whether both of the following conditions are met:
      whether the first certificate contains an authority key identifier (AKI); and
      whether the second certificate contains a subject key identifier (SKI);
   determining that the at least one digital certificate is not invalid when at least one of the conditions is not met; and
   when both of the conditions are met:
      determining that the at least one digital certificate is invalid when the first certificate's AKI does not equal the second certificate's SKI.

4. The computer-implemented method of claim 1, further comprising:
   determining an "Issuer" entry for the first certificate;
   determining a "Subject" entry for the second certificate; and
   determining that the at least one digital certificate is invalid when the first certificate's "Issuer" entry does not equal the second certificate's "Subject" entry.

5. The computer-implemented method of claim 1, the method further comprising:
   retrieving a set of cipher suites for the computing device;
   retrieving a list of approved cipher suites; and
   determining whether a cipher suite in the computing device's set of cipher suites matches a cipher suite in the list of approved cipher suites.

6. The computer-implemented method of claim 1, the method further comprising:
   retrieving a set of cipher suites for the computing device;
   retrieving a list of approved cipher suites; and
   determining whether each cipher suite in the computing device's set of cipher suites matches a cipher suite in the list of approved cipher suites.

7. The computer-implemented method of claim 1, the method further comprising:
   determining the computing device is insecure when a setting on the computing device enables client-side renegotiation of secure communications.

8. A device comprising:
   a processor; and
   a memory coupled to the processor, the memory comprising instructions that, when executed by the processor, cause the processor to effectuate operations comprising:
      receiving, at a computing device with the processor, at least one digital certificate from the server, the at least one digital certificate including a certificate chain that includes a first certificate preceding a second certificate, each certificate in the certificate chain having an expiration date;
      identifying whether the first certificate's expiration date is later than the second certificate's expiration date;
      determining that the at least one digital certificate is invalid when the first certificate's expiration date is later than the second certificate's expiration date;
      determining that the at least one digital certificate is invalid when the first certificate's expiration date is later than the second certificate's expiration date;
      determining whether the first certificate contains an Authority Information Access (AIA) entry with a URL that can be utilized to retrieve a third certificate;
      when the first certificate contains such a URL:
         using the URL in the first certificate's AIA to retrieve the third certificate, and
         comparing the third certificate to the second certificate; and
      determining that the at least one digital certificate is invalid when the second certificate is not identical to the third certificate.

9. The device of claim 8, the instructions further comprising:
   determining an "Issuer" entry for the first certificate;
   determining a "Subject" entry for the second certificate; and
   determining that the at least one digital certificate is invalid when the first certificate's "Issuer" entry does not equal the second certificate's "Subject" entry.

10. The device of claim 8, the instructions further comprising:
    determining whether the first certificate is directly certified by the second certificate; and determining that the at least one digital certificate is invalid when the first certificate is not directly certified by the second certificate.

11. The device of claim 8, the instructions further comprising:
determining whether both of the following conditions are met:
whether the first certificate contains an authority key identifier (AKI); and
whether the second certificate contains a subject key identifier (SKI);
determining that the at least one digital certificate is not invalid when at least one of the conditions is not met; and
when both of the conditions are met:
determining that the at least one digital certificate is invalid when the first certificate's AKI does not equal the second certificate's SKI.

12. A computer-implemented method for testing security settings for a server comprising:
receiving, at a computing device with a processor, at least one digital certificate from the server; and
determining, via the computing device's processor, whether the at least one digital certificate is valid, wherein the step of determining whether the at least one digital certificate is valid comprises:
receive one or more domain name server (DNS) names utilized, by the computing device, to contact the server;
identify one or more subject alternative names (SAN) in the at least one digital certificate;
determining that the at least one digital certificate is invalid when at least one of the one or more DNS names does not have a corresponding entry in the one or more SAN entries; and
determining that the at least one digital certificate is not invalid when each of the one or more DNS names does have a corresponding entry in the one or more SAN entries, wherein the at least one digital certificate comprises a certificate chain that includes a first certificate and a second certificate, each certificate in the certificate chain having an expiration date, wherein the first certificate precedes the second certificate in the certificate chain, and wherein the step of determining whether the at least one digital certificate is valid further comprises:
identifying whether the first certificate's expiration date is later than the second certificate's expiration date; and
determining that the at least one digital certificate is invalid when the first certificate's expiration date is later than the second certificate's expiration date;
determining that the one or more subject alternative names (SAN) in the at least one digital certificate does not have the one or more DNS names;
determining that the at least one digital certificate is invalid when there are two or more of the one or more DNS names used to access the server; and
determining that the at least one digital certificate is not invalid when there is only one of the one or more DNS names and when a common name received from the server matches the one DNS name.

13. The computer-implemented method of claim 12, further comprising:
determining an "Issuer" entry for the first certificate;
determining a "Subject" entry for the second certificate;
determining that the at least one digital certificate is invalid when the first certificate's "Issuer" entry does not equal the second certificate's "Subject" entry;
determining whether the first certificate is directly certified by the second certificate; and
determining that the at least one digital certificate is invalid when the first certificate is not directly certified by the second certificate.

14. The device of claim 8, the instructions further comprising:
determining an "Issuer" entry for the first certificate;
determining a "Subject" entry for the second certificate; and
determining that the at least one digital certificate is invalid when the first certificate's "Issuer" entry does not equal the second certificate's "Subject" entry.

15. The device of claim 8, the instructions further comprising:
determining the computing device is insecure when a setting on the computing device enables client-side renegotiation of secure communications.

16. The device of claim 8, the instructions further comprising:
retrieving a set of cipher suites for the computing device;
retrieving a list of approved cipher suites; and
determining whether a cipher suite in the computing device's set of cipher suites matches a cipher suite in the list of approved cipher suites.

* * * * *